United States Patent [19]

Moritz

[11] 4,111,236
[45] Sep. 5, 1978

[54] TRANSMISSION LINE CARRIER

[75] Inventor: Werner Moritz, Siegen, Fed. Rep. of Germany

[73] Assignee: Kabelschlepp Gesellschaft mit beschränkter Haftung, Siegen, Fed. Rep. of Germany

[21] Appl. No.: 790,171

[22] Filed: Apr. 25, 1977

[30] Foreign Application Priority Data

May 18, 1976 [DE] Fed. Rep. of Germany ....... 2622005

[51] Int. Cl.² .............................................. F16L 11/18
[52] U.S. Cl. .................................. 138/120; 191/12 C; 285/163
[58] Field of Search ..................... 138/120, 118, 155; 59/78.1; 191/12 R, 12 C; 285/163, 164

[56] References Cited

U.S. PATENT DOCUMENTS

| | | | |
|---|---|---|---|
| 1,255,577 | 2/1918 | Berry | 285/163 |
| 1,276,117 | 8/1918 | Riebe | 138/120 |
| 1,822,624 | 9/1931 | Hoeftmann | 138/20 |
| 3,189,372 | 6/1965 | Johnson | 285/163 |
| 3,330,105 | 7/1967 | Weber | 174/69 |

*Primary Examiner*—Richard E. Aegerter
*Assistant Examiner*—L. Footland
*Attorney, Agent, or Firm*—Martin A. Farber

[57] ABSTRACT

A self-supporting transmission line carrier between a moveable consumer and a stationary connection comprising a row of tubular members of any selected cross-sectional shape which are pivotally connected with one another and engage in one another. The tubular members are angled-off from the extended position only in one direction, in a manner whereby the angling-off of the tubular members is limited relative to one another by means of abutments. Each tubular member on one end has an inwardly rimming, circulatory channel, the outwardly angled-off edge of which forms the inner abutment. Each tubular member is shortened on the other end on one half by the width of the channel and has a circulatory inwardly directed angled-off edge which forms the outer abutment. Two adjacent tubular members engage behind one another with their inner and outer abutments and the maximum angling-off is fixed by the width of the channel.

9 Claims, 3 Drawing Figures

U.S. Patent    Sept. 5, 1978    4,111,236
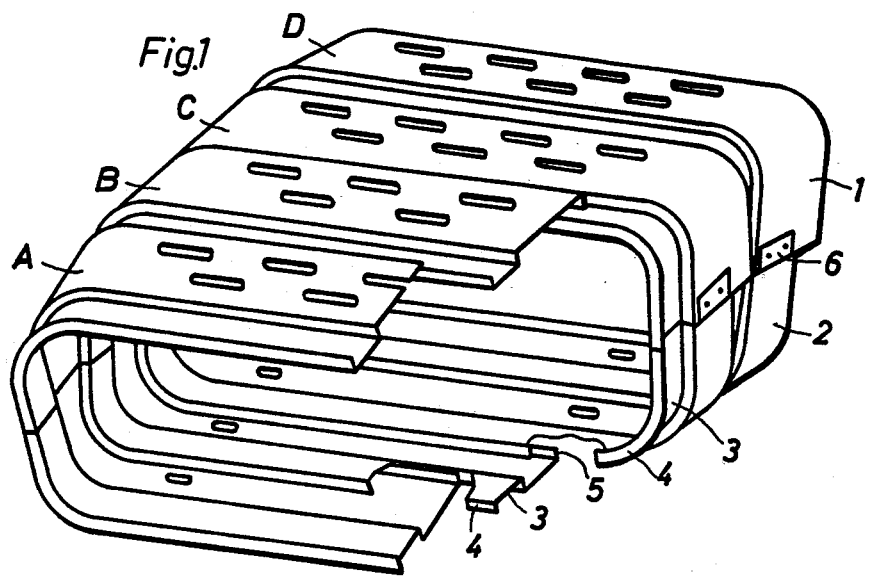
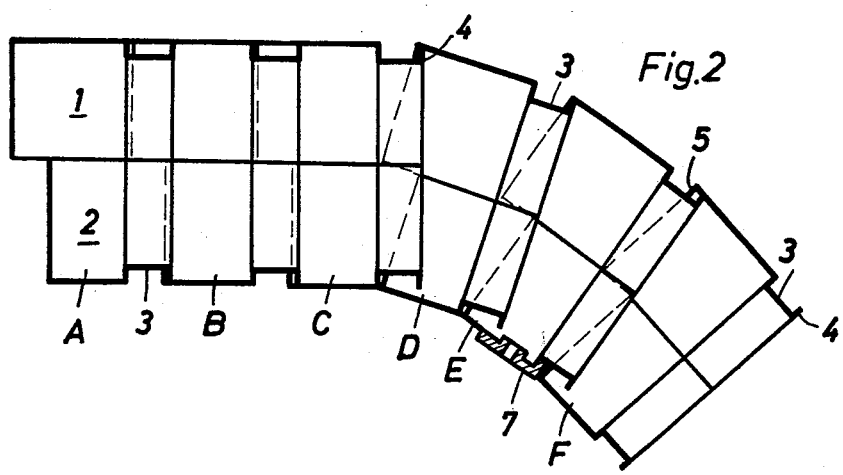
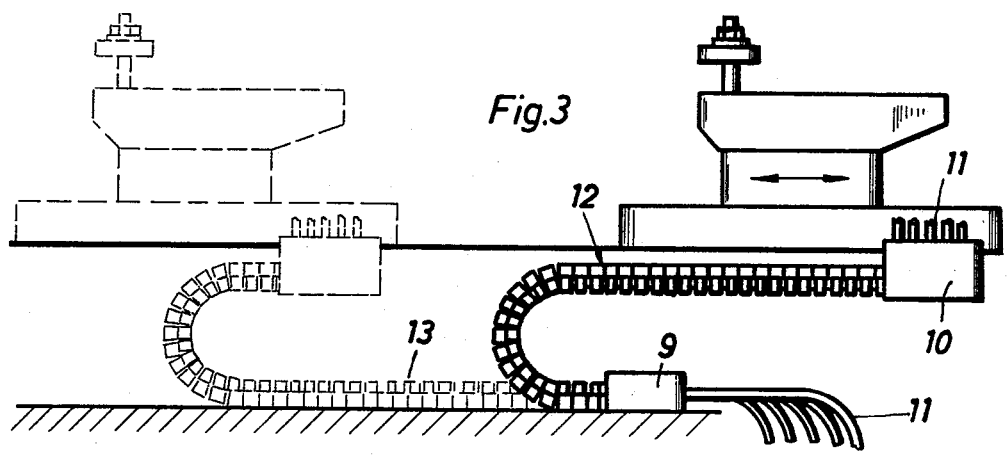

TRANSMISSION LINE CARRIER

The invention relates to a self-supporting transmission line carrier between a moveable consumer and a stationary connection comprising a row of tubular members of any selected cross-sectional shape which are pivotally connected with one another and engage in one another, which tubular members are angled-off from the extended position only in one direction, in a manner whereby the angling-off of the tubular members is limited relative to one another by means of abutments.

Transmission line carriers of the previously described species, which consists of a row of tubular members which are pivotally connected to one another are known (German Auslegeschrift AS No. 1,449,670). By this known transmission line carrier, in alternating succession tubular members are stuck or inserted in one another with larger and smaller transverse dimensions in the range of their ends and are connected with one another by means of hinge pins or bolts. The abutments for limiting the bending or angling-off of the tubular members relative to one another are formed by the inner- and outer- walls, respectively, of the tubular members which are assembled or pinned in one another. This known transmission line carrier has the disadvantage that it is composed of tubular members which are different in spacial design, which tubular members must be connected to one another with special hinge bolts or pins. Consequently it is not possible, or yet only possible with great difficulty, to manufacture the tubular members of this transmission line carrier on an automatic assembly line and to assemble the tubular members to each other by means of the hinge bolts.

On the other hand, devices are also known for the guiding of flexible cables or tubes from one fixed terminal or connection position to a moveable consumer by means of a flexible metal tube (German Offenlegeschrift OS No. 2,341,849). The metal tube used with these known devices as the transmission line carrier indeed can be completely automatically produced on special machines, however in the first place it has no self-supporting characteristics, i.e. the metal tube is flexible at will in any direction. In order from the metal tube to make a transmission line carrier self-supporting, it is necessary to fix the edges of the respective adjoining turns or windings, which engage in one another, against one another along an axis with respect to their spacing in the telescoped or also in the condition pulled out from one another. For this purpose it is known to connect a narrow spring steel band with each individual winding on the outer side or surface of the telescoped metal tube. This metal tube can then still be bent only in the direction toward the spring steel band, while it is self-supporting in the other direction, since the individual windings can no longer open on the side of the spring steel band and in this manner support themselves against one another on the remaining periphery of the metal tube. The use of metal tube as a transmission line carrier has the disadvantage that itself it is not self-supporting, but rather must be made self-supporting by additional devices, for example, a spring steel band to be connected with each winding must be made self-supporting. A further disadvantage resides in that the metal tube on all sides is almost tightly closed and is not ventilated inside so that a heat barrier can develop with the result that the laid or placed transmission lines become damaged. Additionally, the metal tube which is formed as a self-supporting transmission line carrier has the disadvantage that the neutral strand or fiber lies in the plane of the spring steel band, the latter which is connected with the windings, so that the transmission lines can be damaged on the inside by the opening and closing of the windings of the metal tube.

Starting from this, the invention is based on the task to produce a self-supporting transmission line carrier of the tubular members which not only avoid every type of danger of squeezing and clamping toward the inside and outside, but also can be produced and assembled completely automatically from a thin metal sheet or plate, or a plastic synthetic material. Further the invention is based on the object to avoid the disadvantages of the state of the art.

Starting from the introductory described, known self-supporting transmission line carriers, the task on which the invention is based is solved in the matter, that each tubular member (e.g. A,B,C,D) has on one end an inwardly rimming, circulatory channel, (3) whose outwardly angled-off edge 4 forms an inner-lying abutment 4 relative to the adjacent interengaging tubular member, that each tubular member (A,B,C,D) is shortened at the other end on one half (e.g., lower part 2) relative to the other half (e.g. the upper half) by a distance equal to the width of the channel 3 and has a circulatory inwardly directed angled-off edge 5 which forms the outer-lying abutment 5 relative to the adjacent interengaging tubular member, whereby two adjacent tubular member (e.g., A,B) interengage one after another with the respective inner and outer abutments and the maximum relative angling-off is fixed by the width of the channel 3.

With one practical embodiment form, which is produced from a thin metal sheet, the tubular members can be put together or are composed of an upper part, and a lower part which is shorter by the width of the channel. It is possible to butt weld the upper and lower parts with one another or to provide tabs or lugs on the lower part for a point- or projection-welding.

With another practical embodiment form made of synthetic material it is possible to injection mold the tubular members completely in one working operation, whereby then the edges serving as abutments must be slightly chamfered or beveled so that they can be moved past on one another during the assembling or sticking of two tubular members in one another and engage behind one another only in the stuck-in or assembled condition.

In further embodiment of the invention it has proved purposeful to provide air slots in the outer wall of the tubular members so that no heat barrier can form in the per se closed inner space.

A transmission line carrier constructed in accordance with the present invention has the prominent advantage in the embodiment form made of metal sheet as well as also in the injection molded embodiment form made of synthetic material, that the individual tubular members can be completely mechanically produced and can be assembled with one another. A further advantage resides in that the neutral strand or fiber lies approximately in the center plane so that the relative movement of the individual tubular members is very small to the transmission lines accommodated therein. Moreover the transmission lines are taken good care of in the manner that they can be supported on the inside of the orbiting channel. An additional advantage resides in that the maximum bending or angling-off of the individual tubular members, which is fixed by the width of the channel, can be produced in proportion to one another by means of spacers inserted in the channel in the range of the lower parts, so that identical tubular members can be used with different sized radii of curvature for the production of self-supporting transmission line carriers.

Further particulars and advantages of the subject matter of the invention result from the following description of the corresponding drawings, in which one preferred embodiment form of an inventive formed transmission line carrier made of thin sheet steel is illustrated. In the drawing show:

FIG. 1 some tubular members, connected with one another of a transmission line carrier in isometric illustration;

FIG. 2 the same tubular members in reduced illustration and in longitudinal section;

FIG. 3 a functional schematic for an automatic transmission line carrier with a moveable consumer and a stationary connection.

Each tubular member A, B, C, D, etc. comprises an upper part 1 and a lower part 2. Both parts on one end have an inwardly rimming or collaring, surrounding or circulatory channel 3, the outwardly bent or angled-off edge of which forms an inner-lying shoulder or abutment 4. While the upper- and lower- parts 1, 2 of the tubular members A, B, C, D, etc. are constructed identically at the end of the channel 3, the lower part 2, on another end is formed shortened by the width of the channel 3. On this end the upper part 1 as well as the lower part 2 have an inwardly bent or angled-off edge, which forms an outer abutment or shoulder 5.

In the extended position, as it is illustrated in FIG. 2, in the left half of FIG. 2, the inner and outer shoulders 4, 5 engage in the range of the lower part 2, whereas they are spaced from one another by the width of the channel 3 in the range of the upper part 1. In the angled-off or bent position which is illustrated in the right half of FIG. 2, to the contrary the inner and outer abutments or shoulders 4, 5 engage in the range of the upper part 1, while they are spaced from one another by the width of the channel 3 in the range of the lower part 2. The pivot point, about which the tubular members A, B, C, D, etc. can move relative to one another respectively lie in the plane of separation between the upper- and lower- parts 1, 2. The line of connection of the pivot points divides the neutral fiber of this transmission line carrier, which thus lies approximately in the center plane.

The upper part 1 and the lower part 2 of a tubular member A, B, C, D, etc. can be butt welded with one another. In the embodiment example which is illustrated, tabs or lugs are fastened on the lower parts 2, which tabs or lugs can be connected with the upper part 1 by means of spot- or projection-welding. The assembly of the individual tubular members A, B, C, D, etc. with one another takes place simultaneously with the connection of the upper- and lower- parts 1, 2. For this, the upper- and lower- parts 1, 2 are inserted with their outer abutment shoulders 5 in the channel 3 of the adjacent tubular member and then are connected with one another.

The maximum angling-off between two tubular members A, B, C, D, etc., is fixed by the width of the channel 3; however it is possible to reduce the angling-off and consequently to enlarge the radius of curvature, in the manner that a spacer 7 engaging in the channel 3 is fastened on each tubular member.

For ventilation of the inner space in a transmission line carrier, air slots 8 can be provided in the outer wall of the individual tubular members A, B, C, D, etc.

A transmission line carrier constructed and put together according to the previously set forth directions is determined for the purpose that between a stationary connection terminal 9 and a moveable consumer 10, for example the carriage of a tool machine to be used, in order to carefully guide transmission lines, for example, cable- and tubing for electricity, compressed air and/or cooling means, the transmission line carrier must be self-supporting in the upper stringer 12 or runner of the chain, so that it does not sag, and the transmission lines are treated with as much care as possible. Toward the lower runner 13 of the chain the transmission line carrier may only be able to be bent about a radius $r$ which corresponds to the allowable bending radius of the most sensitive transmission line.

All new features mentioned in the specification and illustrated in the drawing are important to the invention, also as far as they are not expressly claimed in the following claims.

I claim:

1. A self-supporting transmission line carrier between a moveable consumer and a stationary connection comprising a row of tubular members of any selected cross-sectional shape operatively pivotally connected relative to one another and engaging in one another, said tubular members bending relative to one another from an extended position thereof only in one direction, each of said tubular members being formed on one end with an inwardly directed rimming, circulatory channel having an outwardly directed angled-off edge forming an inner abutment, each of said tubular members being shorter at the other end on one half thereof by the width of said channel and having a circulatory inwardly directed angled-off edge forming an outer abutment, the bending of the tubular members being limited relative to one another by means of said abutments, each two adjacent of said tubular members engaging behind one another with said inner and outer abutments, the latter moveably disposed relative to one another, and the bending being limited thereby to a maximum by the width of said channel.

2. The transmission line carrier according to claim 1, wherein each tubular member comprises an upper part and a lower part, said lower part is shorter than said upper part by the width of said channel.

3. The transmission line carrier according to claim 2, further comprising tabs on one of said parts, said tabs are spot welded on the other of said parts.

4. The transmission line carrier according to claim 2, further comprising tabs on one of said parts, said tabs are projection welded on the other of said parts.

5. The transmission line carrier according to claim 2, further comprising a spacer means engages in said channel in the range of said lower part for reducing the maximum bending.

6. The transmission line carrier according to claim 1, wherein said tubular members are formed with air slots.

7. The transmission line carrier according to claim 1, wherein
    said tubular members are made of a thin metal sheet,
    a synthetic material coats said thin metal sheet.

8. The transmission line carrier according to claim 1, wherein
    said tubular members are injection molded in one piece of a synthetic material and are formed assembleable.

9. The transmission line carrier according to claim 1, wherein
    said one half constitutes a lower half of said members.

* * * * *